United States Patent
Chow

(10) Patent No.: US 7,181,178 B2
(45) Date of Patent: Feb. 20, 2007

(54) AUTOMATIC GAIN CONTROL

(75) Inventor: Brian Chow, Guildford (GB)

(73) Assignee: Nokia Corporation, Espoo (FI)

( * ) Notice: Subject to any disclaimer, the term of this patent is extended or adjusted under 35 U.S.C. 154(b) by 152 days.

(21) Appl. No.: 10/480,124

(22) PCT Filed: Jun. 27, 2002

(86) PCT No.: PCT/GB02/02981

§ 371 (c)(1),
(2), (4) Date: Apr. 26, 2004

(87) PCT Pub. No.: WO03/003571

PCT Pub. Date: Jan. 9, 2003

(65) Prior Publication Data

US 2004/0185808 A1    Sep. 23, 2004

(30) Foreign Application Priority Data

Jun. 29, 2001 (GB) ................... 0115978.9

(51) Int. Cl.
*H04B 1/04* (2006.01)
*H04B 1/00* (2006.01)
(52) U.S. Cl. ............... 455/127.2; 375/146; 455/115.3
(58) Field of Classification Search .. 455/127.1–127.2, 455/136, 138, 230, 232.1, 234.1, 245.1, 250.1; 375/146

See application file for complete search history.

(56) References Cited

U.S. PATENT DOCUMENTS

| 4,691,377 A | 9/1987 | Yoshihara et al. .......... 455/256 |
| 5,142,695 A | 8/1992 | Roberts et al. ............... 455/89 |
| 5,566,201 A | 10/1996 | Östman ...................... 375/200 |
| 5,584,049 A | 12/1996 | Weaver, Jr. et al. ....... 455/67.1 |
| 6,201,954 B1 | 3/2001 | Soliman ................... 455/226.2 |
| 6,285,863 B1 * | 9/2001 | Zhang ..................... 455/234.1 |
| 6,654,593 B1 * | 11/2003 | Simmons et al. ........ 455/234.1 |
| 6,721,549 B2 * | 4/2004 | Lee et al. ................ 455/234.1 |

FOREIGN PATENT DOCUMENTS

| EP | 0433090 A2 | 6/1991 |
| EP | 0674402 A1 | 9/1995 |
| WO | WO 00/77971 A1 | 12/2000 |

\* cited by examiner

*Primary Examiner*—George Eng
*Assistant Examiner*—Michael Thier
(74) *Attorney, Agent, or Firm*—Harrington & Smith, PC

(57) ABSTRACT

A method of controlling the gain of a receiver of a radio device suitable for use in a spread spectrum communication system comprising at least two base stations and a radio device, the method comprising estimating the extent to which received signal strength will decrease at the radio device when a base station ceases transmission and calculating a gain control signal to increase the gain of the receiver on the basis of the estimation.

14 Claims, 4 Drawing Sheets

AUTOMATIC GAIN CONTROL

FIELD OF THE INVENTION

This invention relates to radio telecommunications and in particular automatic gain control in spread spectrum systems.

BACKGROUND OF THE INVENTION

In the standard specifications for so-called third generation radio telephony there are defined so-called Idle Periods (IPDL) in the downlink. These are used to support time-difference measurements (OTDOA) for location services e.g. sending information relevant to the currently determined locality of the radio device. In particular, the standards drafted by the $3^{rd}$ Generation Partnership Project (3GPP) and numbered 3GPP Technical Specification (TS) 25.214 and TS 25.215 relate to this area.

Section 8 of 3GPP TS 25.214 v.4.0.0 (Release 99) relates to Idle Periods for IPDL location method. In general, during these idle periods all transmissions of physical channels from the base station with which the radio communications device or mobile station is in contact are temporarily ceased. In 3GPP, a base station is known as a Node B and a mobile station is known as UE (User Equipment).

IPDL (Idle Period in Downlink) location method is used, particularly in the FDD (Frequency Division Duplex) mode of WCDMA, to support time difference measurements between two cells by the UE. Idle periods are spaced at pseudo-random intervals in the downlink, whereby the entire transmission of a cell is turned off. A UE camped on such a cell can utilise these idle intervals for measurement of time-of-arrival of transmissions from distant neighbour cells, which would otherwise not be 'visible' to the UE due to the 'near-far' effect. Owing to the sudden decrease in overall received signal power seen by the UE during the first occurrence of an Idle period (caused by the serving cell switching its transmission off), the UE receiver gain needs to be increased. Otherwise clipping or added quantization noise to the received signal may occur, which could adversely affect baseband algorithms such as time of arrival measurement and Automatic Gain Control. The extent of the decrease in received signal power during an idle period can vary greatly, and will be dependent on a number of independent factors, e.g. proximity of the UE to the serving cell, the number of neighbouring cells, etc.

SUMMARY OF THE INVENTION

According to a first aspect of the invention there is provided a method of controlling the gain of a receiver of a radio device suitable for use in a spread spectrum communication system comprising at least two base stations and a radio device, the method comprising estimating the extent to which received signal power will decrease at the radio device when a base station ceases transmission and calculating a gain control signal to increase the gain of the receiver on the basis of the estimation.

Thus the UE receiver gain is increased at the beginning of a first IPDL period to compensate for the decrease in received signal power when the serving cell Base Station ceases transmission. Prior to the occurrence of the first idle period, the invention estimates the extent to which the received signal power will decrease, allowing the UE to make rapid compensation in receiver gain in order to avoid distortion of the input signal during the idle period.

It is considered that, if sufficient compensation is not applied to the receiver gain during the first IPDL period, the varying nature of the decrease in received signal power seen by the UE, together with the presence of strong adjacent channels (amongst other things) could result in the input signal level during the idle period exceeding the available dynamic range of the receiver. This could distort the signal input to subsequent baseband circuitry and adversely affect measurement algorithms and AGC (Automatic Gain Control) operation for subsequent IPDL periods.

To initialise the receiver gain during the first IPDL period without exceeding the dynamic range of the receiver, the invention proposes a method by which there is calculated an initial estimate of the interference level from base stations, other than the serving base station, which will be seen by the UE during an idle period. This calculation is performed prior to the occurrence of the first idle period. The error between the estimated received signal power and the actual received signal power measured during the first idle period can be used later as an input to the receiver AGC (Automatic Gain Control) algorithm for the next IPDL period and so on.

As the frequency of occurrence of idle periods is likely to be no lower than 10 Hz, it can be assumed that the difference in received signal power seen between consecutive idle periods will be small.

The invention attempts to decrease the probability of exceeding receiver dynamic range during the first idle period. This will improve the performance of baseband algorithms such as time difference measurement and AGC.

Preferably an assumption of the proportion of the base station total transmit power that represents the power of the downlink pilot channel (CPICH) is used. This may be stored as a constant in the mobile device (based on empirical assumptions, which may need to be verified by field trials) or may be signalled by the base station.

Preferably the estimating step comprises calculating the interference level from base stations other than the base station serving the receiver. This may be done as follows:

$$I_{oc}/I_o = 1-(est[CPICH\_E_c/I_{or}])^{-1} * CPICH\_E_c/I_o$$

where $I_{oc}/I_o$ is the estimated proportion of total received signal power which represents the interference power from base stations other than the serving base station $I_o$ is the total received signal power (measured over chip b/w at UE antenna). This is the total transmit power of the serving base station and interference from other base stations $I_{oc}$ is the total received interference power from base stations other than serving base station (measured over chip b/w at UE antenna), $(est[CPICH\_E_c/I_{or}])$ is the assumed proportion of serving base station total transmit power that represents the transmitted power of the common channel, $CPICH\_E_c$ is the energy per chip of received common channel from serving base station (measured at UE antenna)

$CPICH\_E_c/I_o$ is the measured ratio of energy per chip of received common channel from serving base station to total received signal power (measured at UE antenna), $I_{or}$ is the total transmit spectral density of the serving base station.

Preferably the common channel is common pilot channel CPICH as defined in 3GPP TS25.211 and the receiver is suitable for operating in a Wideband Code Division Multiple Access system.

In a second aspect of the invention there is provided a radio receiver suitable for use in a spread spectrum communication system comprising at least two base stations and a mobile unit, the receiver comprising an automatic gain control to control the gain of the receiver, wherein the receiver is arranged to estimate the extent to which received signal power will decrease when a base station ceases transmission and to calculate a gain control signal to increase the gain of the receiver on the basis of the estimation.

Preferably the estimating step comprises calculating the interference level from base stations other than the base station serving the receiver.

The receiver preferably is one suitable for use in a Wideband Code Division Multiple Access system.

In a third aspect of the invention there is provided a radio communication system comprising a plurality of base stations and a plurality of mobile stations in radio contact with one or more of the base stations, wherein a base station in radio contact with a mobile station is called a serving base station for said mobile station, the serving base station transmitting at least one dedicated channel and at least one common channel, the mobile station including an antenna for receiving a radio signal and a power amplifier for amplifying the received signal, characterised in that the mobile station is arranged to:

measure the power of the total signal received and the power of the common channel received from the serving base station, calculate an estimate of the total signal power received that would be present if the serving base station were to cease transmission, said calculation being on the basis of the measured received signal power and an assumption of the proportion of the total transmit power of the serving base station that represents the transmission power of the common channel, on the basis of the estimate determine the gain control signal required for the situation when the serving base station transmission is switched off, and when the serving base station transmission is switched off to use the determined gain control signal to control the gain of the power amplifier.

In a further aspect of the invention there is provided a radio communications device for use with a radio communication system comprising a plurality of base stations and a plurality of radio communications devices in radio contact with one or more of the base stations, wherein a base station in radio contact with a radio communications device is called a serving base station for said radio communications device, the serving base station transmitting at least one dedicated channel and at least one common channel, the radio communications device including an antenna for receiving a radio signal and a power amplifier for amplifying the received signal, characterised in that the radio communications device is arranged to measure the power of the total signal received and the power of the common channel received from the serving base station, calculate an estimate of the total signal power received that would be present if the serving base station were to cease transmission, said calculation being on the basis of the measured received signal power and an assumption of the proportion of the total transmit power of the serving base station that represents the transmission power of the common channel, on the basis of the estimate determine the gain control signal required for the situation when the serving base station transmission is switched off, and when the serving base station transmission is switched off to use the determined gain control signal to control the gain of the power amplifier.

The invention can be implemented as a DSP software algorithm and supported by WCDMA specific hardware functionality.

BRIEF DESCRIPTION OFT THE DRAWINGS

The invention will now be described, by way of example only, with reference to the accompanying drawings, in which.

DETAILED DESCRIPTION OF THE INVENTION

Figure 1:
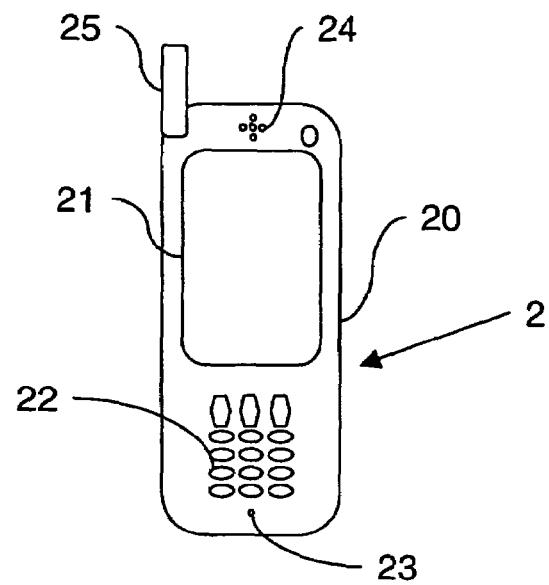
FIG. 1 is a drawing of a radio telephone.
Figure 2:
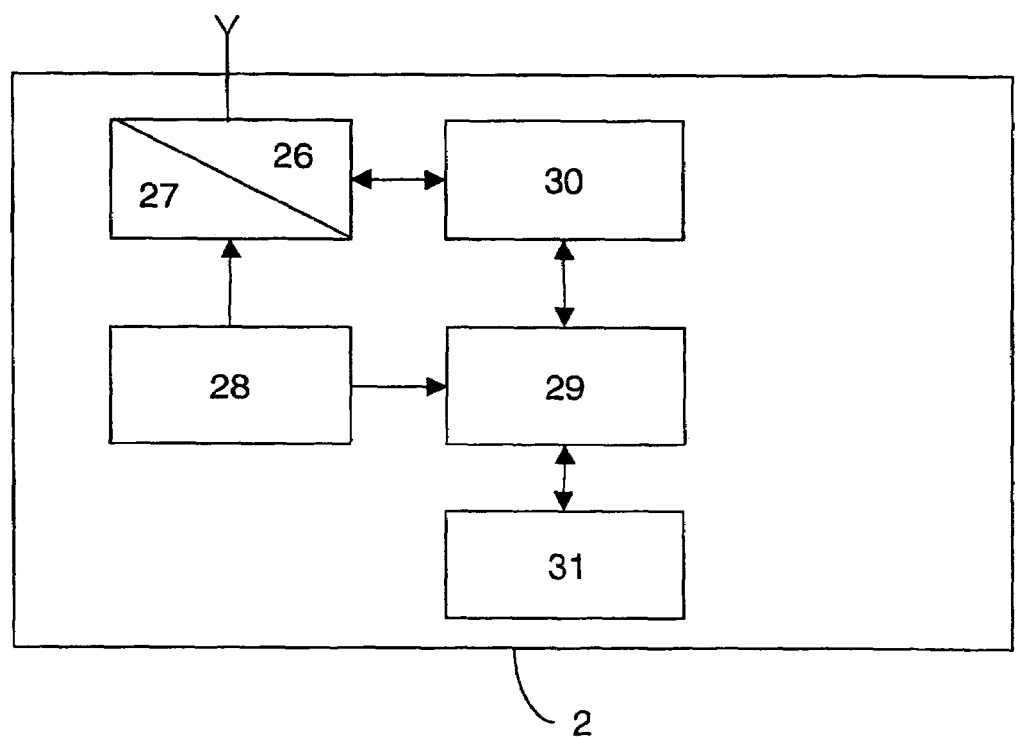
FIG. 2 shows the basic electronic components of the radio telephone of FIG. 1.

FIG. 1 shows a radio telephone 2, such as a radio telephone that operates according to a spread spectrum system such as a Wideband Code Division Multiple Access (WCDMA) system. The phone includes a main body 20, a display 21, an input device such as a keypad 22, a microphone 23, a speaker 24 and an antenna 25. As shown in FIG. 2, the phone also includes a radio transceiver (comprising a radio transmitter 26 and a radio receiver 27), a power source 28, a processor 29, baseband circuitry 30 and memory 31. The radio telephone may of course include components other than those shown but only those components material to the invention have been shown.

Figure 3:
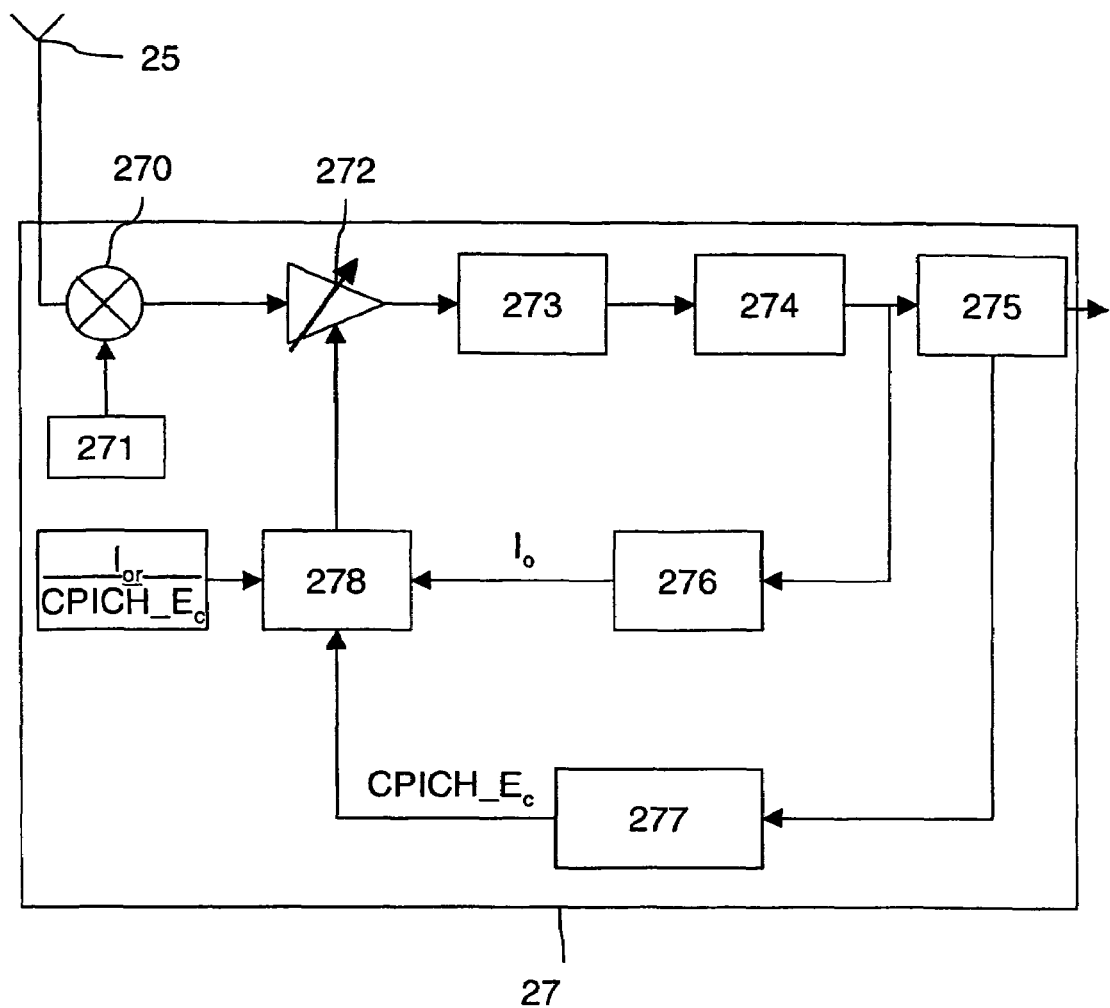
FIG. 3 is a schematic diagram of a receiver according to the invention.

FIG. 3 shows a receiver according to the invention. As shown in FIG. 3, the receiver 27 comprises a mixer 270, a local oscillator (LO) 271, a variable-gain power amplifier 272, a demodulator 273, an analogue-to-digital converter (ADC) 274, a RAKE receiver 275, a signal strength measurement component 276, a signal energy measurement component 277 and a gain adjustment circuit 278.

The receiver 27 operates as follows. When a signal is received by the antenna 25, the frequency of the received signal is down converted from the received frequency to an intermediate frequency (IF) by the mixer 270. Input to the mixer is a signal from a LO 271. The mixer produces two signals (one of which is the sum of the input frequencies and the other of which is the difference between the input frequencies). The mixer outputs the difference signal. The signal output from the mixer 270 is then boosted by a variable-gain power amplifier 272. The analogue signal is then converted to a digital signal by Analogue-to-Digital Converter (ADC) 274 and the digital signal forwarded to a Rake receiver 275. The power of the received signal is measured in the digital domain by component 276 and the energy of the received pilot signal of the serving base station is measured on a chip level by the energy measuring component 277. Component 277 takes as its input signal the despread output of each finger of the rake receiver that is tracking the common pilot channel from the serving base station.

Thus the output of the received signal power measuring component 276 is $I_o$, the total received signal power measured over the chip bandwidth, and the output of the common pilot channel energy measuring component 277 is CPICH_$E_c$. (The output of each of these measurement components is referenced to the UE antenna, i.e. the current receiver gain is taken into account). These are input to the gain adjustment circuit 278 which then calculates the gain control signal needed during an idle period as will be explained below. Also input to the gain control circuit 278 is the assumption of the proportion of the total transmit signal power from a serving base station that relates to the transmit power of the common pilot channel. This indication is stored in a memory (which may be the same as memory 31).

Figure 4:
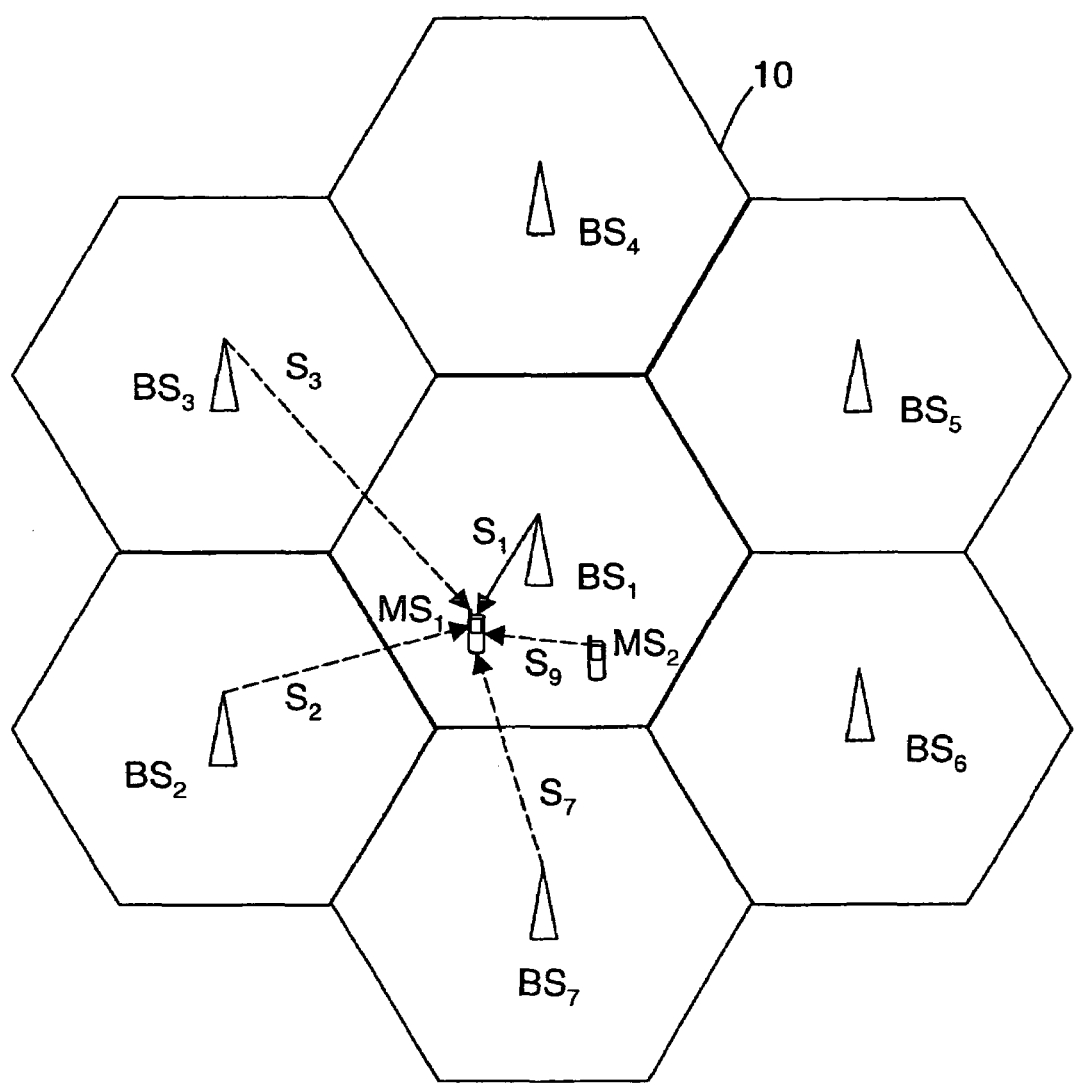
FIG. 4 is a schematic diagram of a radio communications network according to the invention.

FIG. 4 is a schematic illustration of a cellular radio communications network, for instance an UTRAN of a 3G network. The network comprises a number of base stations BS, also known as Node B's. Each BS covers a geographical cell, indicated by hexagon 10. In the illustration, in the centre cell there are two mobile stations $MS_1$, and $MS_2$. The Base Station numbered $BS_1$ is the serving base station for both $MS_1$ and $MS_2$ and both mobile stations are in radio contact with $BS_1$.

Note that this is a simplified illustration where each mobile station is in radio contact with only one BS at any time (i.e the 'Soft-Handover' capability of UTRA is not considered for the purpose of the illustration).

Considering $MS_1$, the signal received from $BS_1$ is $S_1$ (shown as a solid arrow) and the signals received from the surrounding base stations and mobile stations are indicated by dotted arrows. These signals $S_2$, $S_3$, $S_7$ and $S_9$ are generally known as interference signals as far as $MS_1$ is concerned, since these signals are not intended for $MS_1$. Thus the total received signal strength received by the mobile station $MS_1$ is the sum of signals $S_1$, $S_2$, $S_3$, $S_7$ and $S_9$.

The signal $S_1$ from the serving base station $BS_1$ comprises at least one common channel and at least one dedicated channel. In WCDMA the at least one common channel includes a Common Pilot Channel CPICH. When IPDL is active, the transmission from $BS_1$ is pseudo-randomly switched off for a short time period so that time-difference measurements may be made by the mobile station $MS_1$, these measurements being taken on signals received from other base stations e.g. $BS_2$, $BS_3$ and $BS_7$. According to section 8 of 3GPP TS 25.214, the network signals various parameters to a mobile station if IPDL is to be enabled. First, a mobile station will signal to the UTRAN that it is IPDL compatible. The network will then signal the mobile station with parameters relating to at least the type of idle periods to be used (continuous or burst), the spacing of the idle periods and the length of the idle periods. Once the mobile station has received this information, it is stored in the memory 31 and the mobile station carries out the idle period measurements at the appropriate times. During the idle periods, the received signal power measured by $MS_1$ will decrease since the serving base station transmission is turned off. The gain of the power amplifier 272 of the receiver is increased to cope with this reduction in the received signal power.

As mentioned above, an initial estimate of the interference level from base stations other than the serving base stations is calculated and this is used to control the gain of the power amplifier of the receiver of the mobile station for the first idle period encountered by $MS_1$ when IPDL is activated.

An implementation of the estimation of received interference level due to neighbour cells will now be described. In this embodiment, the received signal power measured is the RSSI of the signal.

If $I_o$=total received RSSI (i.e. serving base station+interference from other cells) measured over chip b/w, $I_{oc}$=Total received Interference from other cells.

CPICH_$E_c$=Energy per chip of received pilot channel (CPICH) from serving base station CPICH_Ec/$I_o$=measured ratio of energy per chip of received pilot channel (CPICH) from serving cell to total received RSSI.

$I_{or}$=Total transmit spectral density of serving base station.

Then:

$$I_{oc}=I_o-I_{or} \quad (1)$$

$$I_{oc}=I_o-(CPICH\_E_c/I_{or})^{-1}*CPICH\_E_c \quad (2)$$

CPICH_$E_c/I_{or}$ is unknown by the UE and represents the proportion of the signal received by the mobile station from the serving base station that represents the common channel. This can vary on a WCDMA timeslot slot basis due to fast power control applied to dedicated traffic channels transmitted by the serving base station. Hence an estimate is used based on typical base station physical channel configuration, e.g.

$$est[CPICH\_Ec/I_{or}]=-10 \text{ dB}.$$

This indication of the proportion of the transmitted signal that represents the common pilot channel is stored in the memory 279 of the receiver 27 of the mobile station. Alternatively the network can signal the information to the mobile station which then stores the indication in the memory 279.

The relative decrease in RSSI ($I_{oc}/I_o$) that will occur during the first IPDL period can then be estimated by re-arranging equation (2), i.e.

$$I_{oc}/I_o=1-(est[CPICH\_Ec/I_{or}])^{-1}*CPICH\_E_c/I_o \quad (3)$$

(CPICH_$E_c/I_o$ is a UE measurement quantity which is also used to monitor the downlink quality of the serving base station).

In practice, est[CPICH_$E_c/I_{or}$] is set to be less than the assumed CPICH_$E_c/I_{or}$ to account for the case where $I_{or}/I_{oc}$ is large (i.e. UE is close to serving base station) and for log-normal variation in $I_{oc}$. Otherwise the estimate can become negative.

Reducing est[CPICH_$E_c/I_{or}$] has the effect of biasing the estimation such that it tends to over-estimate the interference from other cells.

For instance, say $I_{oc}/I_o$=0.1. Then the gain during an idle period needs to be increased by 10 dB over that used when the serving base station is transmitting. The mobile station stores this information in the memory 31 and, when an IPDL is enabled, the gain control circuit 278 outputs a gain control signal that adjusts the gain of the power amplifier by 10 dB.

$I_{oc}/I_o$ can be re-calculated each time the UTRAN signals to the mobile station that IPDL has become active.

Figure 5:
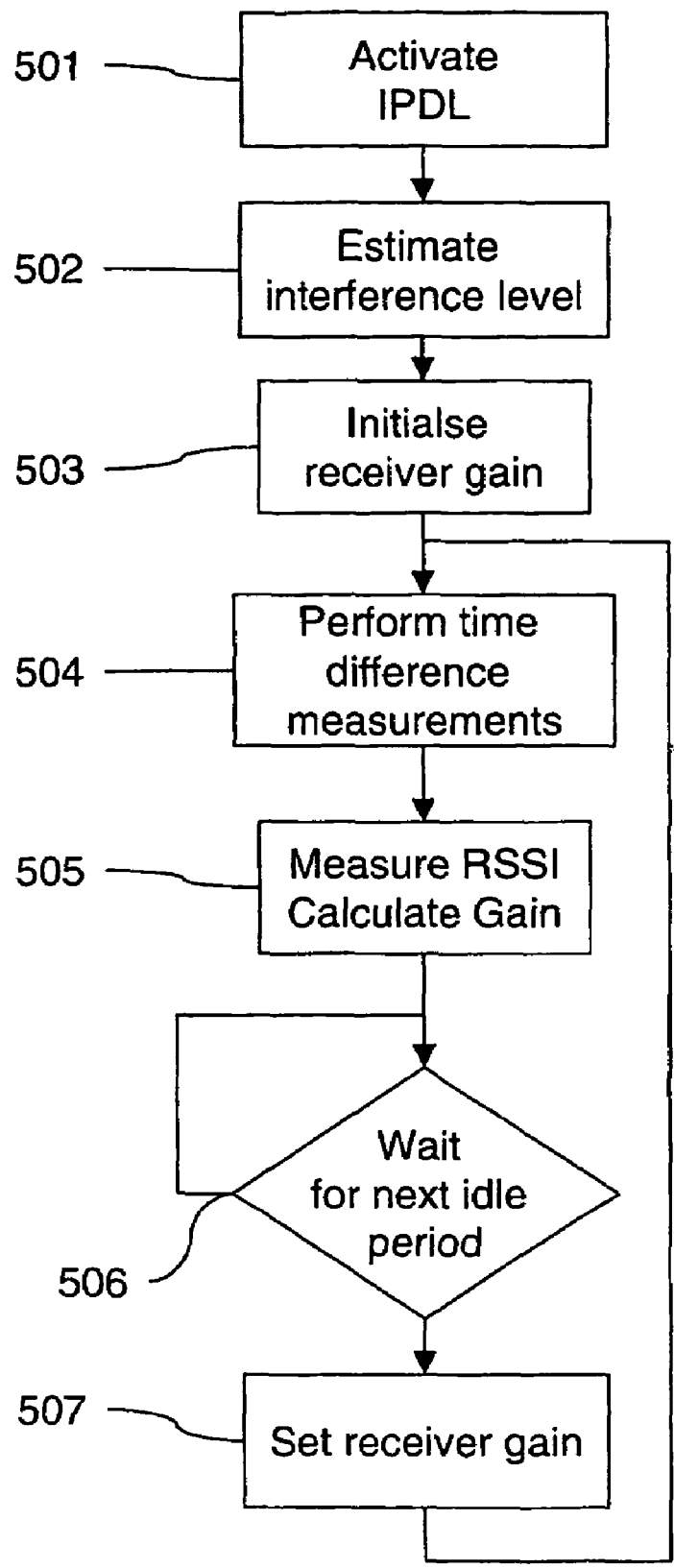
FIG. 5 is a flow diagram illustrating the operation of a receiver according to an embodiment of the invention.

A flow chart illustrating the operation of a radio communication device according to the invention is shown in FIG. 5. First (501) observance of IPDL is activated in the mobile station. As discussed above, this is signalled by the serving base station. Next (502) the mobile station estimates the interference level $I_{oc}/I_o$ from neighbour cells prior to the first IPDL period. At the start of the next IPDL period, the mobile station initialises the receiver gain (503) according to the estimated interference level from neighbour cells. Time difference measurements of the neighbour cells (504) are then carried out using the signal(s) received during the idle period. The mobile station also measures (505) the received signal power during the idle period and calculates the error in receiver gain. Once the IPDL has ended, the mobile station then waits (506) for the start of the next idle period. At the start of the next idle period, the mobile station sets the receiver gain (507) according to the gain error calculated during the previous idle period and then carries out the time difference (OTDOA) measurement (504). The network can instruct the mobile station to de-activate IPDL at any time.

To verify the effectiveness of the estimation in equation (3), a simulation environment based on a mobile locator model was set up. The simulation model positioned a UE randomly within a 'network' of 24 cells, allowing a comparison to be made between actual and estimated interference level due to cells other than the serving cell during an idle period.

Effects of fast power control were simulated by uniformly randomly adjusting $CPICH\_Ec/I_{or}$ of each cell over a range of –8 dB to –12 dB.

The total power of each of the 24 cells in the simulation environment was also set to randomly vary between ±5 dB's relative to each other (i.e. max. power difference between any two cells was 10 dB).

A transmission noise floor of –44 dB was also added to the measured $I_{oc}/I_o$ (simulating base station transmission noise during an IPDL period).

In order to account for variation in $I_{or/Ioc}$, $est[CPICH\_Ec/I_{or}]$ was set to –7.78 dB.

The simulation was run over $10^4$ iterations i.e. the UE was randomly positioned in the network 10,000 times.

The results showed that it was possible to estimate $I_{oc}/I_o$ to within 20 dB with >95% probability.

Thus it is possible to initialise the receiver gain at the beginning of the first IPDL period by prior estimation of the interference level of neighbour cells. Once the receiver gain is initialised, the first IPDL period can be used solely to measure received signal power, such that the error between RSSI and the constant stored in memory 279 can be used to adjust the receiver gain for the next IPDL slot and so on.

The invention claimed is:

1. A method of controlling the gain of a receiver of a radio device suitable for use in a spread spectrum communication system comprising at least two base stations which are operable to cease transmission to create idle periods, and a radio device, the method comprising estimating, prior to an idle period commencing, the extent to which received signal power will decrease at the radio device during a future idle period of a base station when the base station ceases transmission, calculating a gain control signal to increase the gain of the receiver during the future idle period on the basis of the estimation, storing the gain control signal, waiting for an idle period to commence, and using the previously stored gain control signal during the idle period to control the gain of the receiver, wherein the estimating step comprises calculating an interference level from base stations other than the base station serving the receiver, wherein the interference level is calculated as follows:

$$I_{oc}/I_o = 1 - (est[CPICH\_Ec/I_{or}])^{-1} * CPICH\_E_c/I_o$$

where $I_o$=total received signal power $I_{oc}$=total received Interference power from base stations other than serving base station, $(est[CPICH\_Ec/I_{or}])$ is an assumed proportion of serving base station total transmit power that represents the transmitted power of a common channel, $CPICH\_E_c$=energy of received common channel from serving base station, $CPICH\_E_c/I_o$=measured ratio of energy per chip of received common channel from serving base station to total received signal power, $I_{or}$=Total transmit spectral density of serving base station.

2. A method according to claim 1 wherein the common channel is a common pilot channel CPICH.

3. A method according to claim 1, wherein the receiver is suitable for operating in a Code Division Multiple Access system.

4. A method according to claim 1, wherein an assumed proportion of serving base station total transmit power that represents the transmitted power of a common channel is stored in the receiver.

5. A radio receiver suitable for use in a spread spectrum communication system comprising at least two base stations which are operable to cease transmission to create idle periods, and a mobile unit, the receiver comprising an automatic gain control to control the gain of the receiver, wherein the receiver is arranged to estimate, prior to an idle period commencing, the extent to which received signal strength will decrease during a future idle period of a base station when the base station ceases transmission, and to calculate a gain control signal to increase the gain of the receiver during a future idle period on the basis of the estimation, the receiver further comprising a store and being operable to store the calculated gain control signal for future use, to wait for an idle period to commence, and to use the previously stored gain control signal during the idle period to control the gain of the receiver, wherein the estimating step comprises calculating an interference level from base stations other than the base station serving the receiver, wherein the receiver is arranged to calculate the interference level as follows:

$$I_{oc}/I_o = 1 - (est[CPICH\_Ec/I_{or}])^{-1} * CPICH\_E_c/I_o$$

where $I_o$=total received signal power $I_{oc}$=total received Interference power from base stations other than serving base station $(est[CPICH\_Ec/I_{or}])$ is an assumed proportion of serving base station total transmit power that represents the transmitted power of a common channel, $CPICH\_E_c$=energy of received common channel from serving base station, $CPICH\_E_c/I_o$=measured ratio of energy per chip of received common channel from serving base station to total received signal power, $I_{or}$=Total transmit spectral density of serving base station.

6. A receiver according to claim 5, wherein the receiver is suitable for use in a Wideband Code Division Multiple Access system.

7. A receiver according to claim 5, wherein an assumed proportion of serving base station total transmit power that represents the transmitted power of a conunon channel is stored in the receiver.

8. A radio communication system comprising a plurality of base stations and a plurality of mobile stations in radio contact with one or more of the base stations, wherein a base station in radio contact with a mobile station is called a serving base station for said mobile station, the serving base station transmitting at least one dedicated channel and at least one common channel, the mobile station including an antenna for receiving a radio signal and a power amplifier for amplifying the received signal, characterised in that the mobile station is arranged to:

- measure the power of the total signal received and the power of the common channel received from the serving base station,
- calculate an estimate of the total signal power received that would be present if the serving base station were to cease transmission, said calculation being on the basis of the measured received signal power and an assumption of the proportion of the total transmit power of the serving base station that represents the transmission power of the common channel,
- on the basis of the estimate determine the gain control signal required for the situation when the serving base station transmission is switched off, and w
- hen the serving base station transmission is switched off to use the determined gain control signal to control the gain of the power amplifier.

9. A radio communication system according to claim 8 wherein the estimating step comprises calculating an interference level from base stations other than the base station serving the receiver.

10. A radio communication system according to claim 9 wherein the interference level is calculated as follows:

$$I_{oc}/I_o = 1-(est[CPICH\_Ec/I_{or}])^{-1} * CPICH\_E_c/I_o$$

where
- $I_o$=total received signal power
- $I_{oc}$=total received Interference power from base stations other than serving base station,
- (est[CPICH_Ec/I_{or}]) is an assumed proportion of serving base station total transmit power that represents the transmitted power of a common channel,
- CPICH_$E_c$=energy of received common channel from serving base station,
- CPICH_$E_c/I_o$=measured ratio of energy per chip of received common channel from serving base station to total received signal power,
- $I_{or}$=Total transmit spectral density of serving base station.

11. A radio communications device for use with a radio communication system comprising a plurality of base stations and a plurality of radio communications devices in radio contact with one or more of the base stations, wherein a base station in radio contact with a radio communications device is called a serving base station for said radio communications device, the serving base station transmitting at least one dedicated channel and at least one common channel, the radio communications device including an antenna for receiving a radio signal and a power amplifier for amplifying the received signal, characterised in that the radio communications device is arranged to

- measure the power of the total signal received and the power of the common channel received from the serving base station,
- calculate an estimate of the total signal power received that would be present if the serving base station were to cease transmission, said calculation being on the basis of the measured received signal power and an assumption of the proportion of the total transmit power of the serving base station that represents the transmission power of the common channel,
- on the basis of the estimate determine the gain control signal required for the situation when the serving base station transmission is switched off, and
- when the serving base station transmission is switched off to use the determined gain control signal to control the gain of the power amplifier.

12. A radio communications device according to claim 11 wherein an assumed proportion of serving base station total transmit power that represents the transmitted power of a common channel is stored in a receiver of the radio communication device.

13. A radio communications device according to claim 11 wherein the estimating step comprises calculating an interference level from base stations other than the base station serving the receiver.

14. A radio communications device according to claim 13 wherein the interference level is calculated as follows:

$$I_{oc}/I_o = 1-(est[CPICH\_Ec/I_{or}])^{-1} * CPICH\_E_c/I_o$$

where
- $I_o$=total received signal power
- $I_{oc}$=total received Interference power from base stations other than serving base station,
- (est[CPICH_Ec/I_{or}]) is an assumed proportion of serving base station total transmit power that represents the transmitted power of a common channel,
- CPICH_$E_c$=energy of received common channel from serving base station,
- CPICH_$E_c/I_o$=measured ratio of energy per chip of received common channel from serving base station to total received signal power,
- $I_{or}$=Total transmit spectral density of serving base station.

* * * * *